(12) United States Patent
Garcia Grau et al.

(10) Patent No.: US 12,083,746 B2
(45) Date of Patent: Sep. 10, 2024

(54) SLICE DATA AND ADDITIONAL DATA

(71) Applicant: HEWLETT-PACKARD DEVELOPMENT COMPANY, L.P., Spring, TX (US)

(72) Inventors: Marc Garcia Grau, Sant Cugat del Valles (ES); Sergi Culubret i Cortada, Sant Cugat del Valles (ES); Sergio Puigardeu Aramendia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 375 days.

(21) Appl. No.: 17/511,824

(22) Filed: Oct. 27, 2021

(65) Prior Publication Data

US 2023/0129660 A1 Apr. 27, 2023

(51) Int. Cl.
*B29C 64/393* (2017.01)
*B29C 64/153* (2017.01)
*B29C 64/188* (2017.01)
*B33Y 50/02* (2015.01)
*B33Y 10/00* (2015.01)

(52) U.S. Cl.
CPC .......... *B29C 64/393* (2017.08); *B29C 64/153* (2017.08); *B29C 64/188* (2017.08); *B33Y 10/00* (2014.12); *B33Y 50/02* (2014.12)

(58) Field of Classification Search
CPC ... B29C 64/393; B29C 64/153; B29C 64/188; B29C 64/165; B33Y 10/00; B33Y 50/02; B33Y 30/00; B22F 10/14
See application file for complete search history.

(56) References Cited

U.S. PATENT DOCUMENTS

| 2015/0266235 | A1 | 9/2015 | Page | |
| 2016/0332380 | A1* | 11/2016 | De Pena | B33Y 30/00 |
| 2017/0203515 | A1* | 7/2017 | Bennett | B29C 64/393 |

* cited by examiner

*Primary Examiner* — Yuhui R Pan
(74) *Attorney, Agent, or Firm* — Michael Dryja

(57) ABSTRACT

A 3D printer is disclosed herein. The 3D printer comprises a build material distributor, an agent delivery device and a controller. The controller obtains slice image data of a sliced virtual build volume including a 3D object to be generated, where the slice image data is indicative, for each slice, of the portions of corresponding build material layers to be solidified. The controller is to determine print data corresponding to each slice, the print data defining a density of printing agent to be applied to regions of each layer based on the slice image data; and to obtain additional data relating to a portion of a slice that corresponds to a sloped portion of the 3D object. The controller is further to modify the determined print data to modify the density of printing agent to be printed at a portion of a given build material layer based on the additional data. The controller is also to control the build material distributor to generate a build material layer; and the agent delivery device to selectively eject the printing agent based on the modified print data.

12 Claims, 6 Drawing Sheets

SLICE DATA AND ADDITIONAL DATA

BACKGROUND

Some additive manufacturing or three-dimensional printing systems generate 3D objects by selectively solidifying portions of a successively formed layers of build material on a layer-by-layer basis. The build material which has not been solidified is separated from the 3D objects.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1:
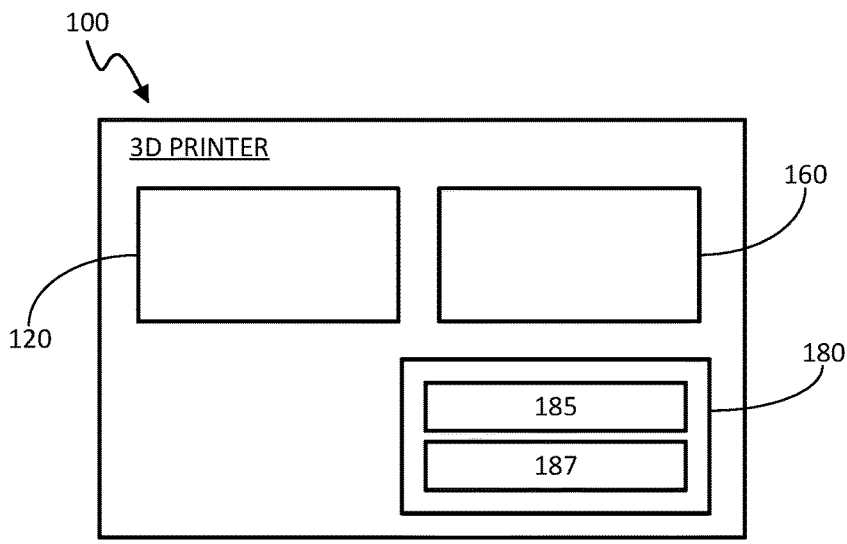
FIG. 1 is a schematic diagram showing an example of a 3D printer.

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable.

For simplicity, it is to be understood that in the present disclosure, elements with the same reference numerals in different figures may be structurally the same and may perform the same or similar functionality.

3D printers generate 3D objects based on data in a 3D model of an object or objects to be generated. This data may be pre-processed by a computing system in a suitable format for the 3D printer. In some examples, the pre-processing may include arranging models of the 3D objects in a virtual build volume corresponding to the physical build volume in which the 3D objects are to be generated, for example in the build volume of a 3D printer. A print job, or other print data, describing the arrangement of 3D objects models within the virtual build volume may be sent to the 3D printer to cause the printer to generate the 3D objects.

3D printers may generate 3D objects by selectively processing layers of build material. For example, a 3D printer may selectively form and solidify portions of a layer of build material, e.g. a powder, corresponding to a slice of 3D object model to be generated and leaving portions of the layer un-solidified in the areas where no portion of a 3D object is to be generated. The collection of processed build material layers is referred to as a build bed. A build bed is to typically be formed in a build chamber (or build volume) of a build unit.

Many printing systems transform the virtual build volume into a plurality of virtual slices (referred to herein as 'slices') having a predetermined thickness. The thickness of each slice is often based on the thickness of layer of build material to be formed by a 3D printed to generate each layer of the 3D object. Each slice is represented by 2D slice images.

In some examples, the slicing process may take place in a computing system which is external to the 3D printer, and the resulting slices are then sent to the 3D printer. In other examples, however, the slicing transformation takes place in the 3D printer.

The slicing process is a discretization of the virtual build volume, since 3D slices are represented as 2D slice images. Accordingly, some quantization of object geometry may occur, especially, for example on portions of objects that are sloped compared to the slicing plane.

Consequently, when a 3D object is generated using a layer-based 3D printing process a quality defect known as stair stepping may be visible in 3D printed objects, especially on certain sloped surfaces. The magnitude of the stair stepping defect is based on the orientation of the 3D object within the build volume. In some cases, stair stepping can be alleviated by orientating objects such that planar surfaces are aligned, where possible, horizontally (i.e. in the same place as the layers of build material that is to be used to generate the object). However, oftentimes d it may not be possible to suitably orient objects to alleviate all stair stepping within an object.

To reduce the magnitude of the stair stepping defect, some 3D printing systems generate 3D objects using thinner layers of powder and consequently transform the virtual build volume to a plurality of thinner slices. However, increasing the number of slices into which a virtual build volume is divided may result in higher computation costs, which can slow down the printing process (as more layers are being computed and generated within a same build). Furthermore, generation of very thin layers of powder can cause further quality defects known as crazing. Crazing is a phenomenon caused when a build material spreader (e.g., recoater roller) drags and removes the underlaying thin build material layer, thereby generating a noticeable part quality defect.

Suitable powder-based build materials for use in additive manufacturing include polymer powder (e.g., Nylon, PA11, PA12, thermoplastic polyurethane, thermoplastic polyamide, polypropylene, etc.), metal powder (e.g., stainless steel) or ceramic powder. In some examples, non-powdered build materials may be used such as gels, pastes, and slurries.

Some 3D printers may selectively process portions of a layer of build material by ejecting a printing fluid in a pattern corresponding to the 3D object and then apply energy to the layer. 3D printers may apply energy to the build material layer, using for example, an energy source. Examples of printing fluids may include fusing agents, detailing agents, curable binder agents or any printing fluid suitable for the generation of a 3D object.

Some of the above referred agents need to be cured after printing. In the examples herein, a curing process may be understood as raising the temperature of a build volume such that a chemical reaction (e.g., polymerization) or a physical action (e.g., evaporation) takes place, resulting in a harder, tougher or more stable linkage of the particles onto which the agent was ejected or is absorbed. In an example, when using a thermally curable binder agent, after the printing and curing processes, the particles are attached to each other in a weak bound forming the so-called green parts. This bound is strengthened upon exposing such green parts to curing conditions. After the curing operation, the build volume may be allowed to cool down so that the 3D objects may be separated from the un-solidified build material.

Referring now to the drawings, FIG. 1 is schematic diagram showing an example of a 3D printer 100.

The 3D printer 100 elements are to interact with a platform (not shown) in which the build bed is generated. In some examples, the platform is part of the 3D printer 100. In other examples, the platform is part of a removable build unit (not shown) that is to engage and disengage from the 3D printer 100. The platform is a moveable platform within a build chamber. In some examples, the platform is to move vertically within the build chamber, e.g., downwardly for a distance corresponding to the thickness of the successive build material layer to be generated. Some examples of build material layer thicknesses are 80 microns, 60 microns, 50 microns, 30 microns and 20 microns.

The 3D printer 100 comprises a build material distributor 120 to generate a layer of build material on the build platform or on the uppermost generated build material layer. The build material distributor 120 may comprise a recoating roller, a doctor blade, or an overhead build material dispensing hopper, for instance.

In some examples, the 3D printer 100 includes an energy source to emit energy to the uppermost generated build material layer. In some examples, the energy source includes a halogen lamp (e.g., Tungsten lamp) or halogen lamp array. In other examples, the energy source comprises an array of solid-state emitters. For example, the array of solid-state emitters is an array of Light-Emitting Diodes (LED), an array of Laser Diodes (LD) such as Edge Laser Diodes (ELD) and/or an array of Vertical-Cavity Surface-Emitting Lasers (VCSEL). In yet another example, the array of solid-state emitters may be a combination of at least two of LEDs, LDs and VCSELS.

LEDs, LDs and VCSELs are formed by semiconductor diodes. The choice of the semiconductor material determines the wavelength of the emitted light beam, which may range from the infra-red to the UV spectrum. In the examples herein, the type of solid-state emitters of the solid-state emitters array is selected to emit energy in a narrow-band of wavelengths to be more largely absorbed by, for example, a fusing agent than by build material on which no fusing agent is applied. In the present disclosure, a narrow-band of wavelengths may be understood as a band of wavelengths from the electromagnetic spectrum which is no wider than 150 nm.

In an example, the energy source is implemented as a static overhead top lamp array located above the build material layer. The static top lamp array is designed such that at least one energy source from the energy source array is to emit energy to each portion of the build material layer.

In another example, the energy source is in a scanning carriage (not shown) located above the build material layer to move along the width and/or the length of the build material layer. The scanning carriage may be the same carriage or a different carriage than the agent delivery device 160 described below. In an example, the energy source is to span the full width of the build material layer and is to scan along the length of the build material layer. In another example, the energy source is to span the full length of the build material layer and is to scan along the full width of the build material layer.

The 3D printer 100 further comprises the agent delivery device 160. The agent delivery device 160 is a carriage to scan over the width and/or the length of the build material layer in the same or in a similar manner as the examples described above with reference to the scanning carriage comprising the energy source. In some examples, the agent delivery device 160 and the energy source may be, at least in part, in the same scanning carriage assembly.

As disclosed herein in accordance with some examples, a 3D printer is to generate 3D objects by selectively ejecting an agent onto successively formed layers of a build material. The agent delivery device 160 is to selectively deposit a printing agent (e.g., fusing agent, detailing agent, and/or binder agent) on the build material layer in respective independent patterns by means of, for example, a printhead or a plurality of printheads. The printhead may be a thermal inkjet printhead or a piezoelectrical printhead, for instance. A fusing agent is a liquid comprising energy absorbent particles (e.g., Carbon black) to absorb energy irradiated by an energy source (e.g., heating lamps). In other examples, the agent is a binder agent. In one example, the binder agent can include a binder in a liquid carrier or vehicle for application to the particulate build material. In some examples, the printed object may be subject to a post-processing (e.g., curing).

As mentioned above, the 3D objects may be generated through the selective ejection of a printing agent by the agent delivery device 160. The resolution on the horizontal XY plane corresponding to each of the build material layers may be of the order of magnitude of 1200-1400 dpi (i.e., drops per inch), which means that each addressable location on the powder layer is about 20 microns by 20 microns.

The 3D printer 100 comprises a controller 180. The controller 180 comprises a processor 185 and a memory 187 on which are stored specific control instructions to be executed by the processor 185. The functionality of the controller 180 is described further below with reference to FIG. 2B. In some examples, the controller 180 is also to execute the functionality described in FIG. 2A.

In the examples herein, the controller 180 may be any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller 180 may be, at least partially, implemented in the form of an electronic circuitry. The controller 180 may be a distributed controller, a plurality of controllers, and the like. In the examples herein, 3D print data is modified to include the ejection of an additional amount of an agent to, for example, reduce a stair stepping effect without modifying the orientation of a 3D printer object nor modifying the thickness of the slices.

Figure 2A:
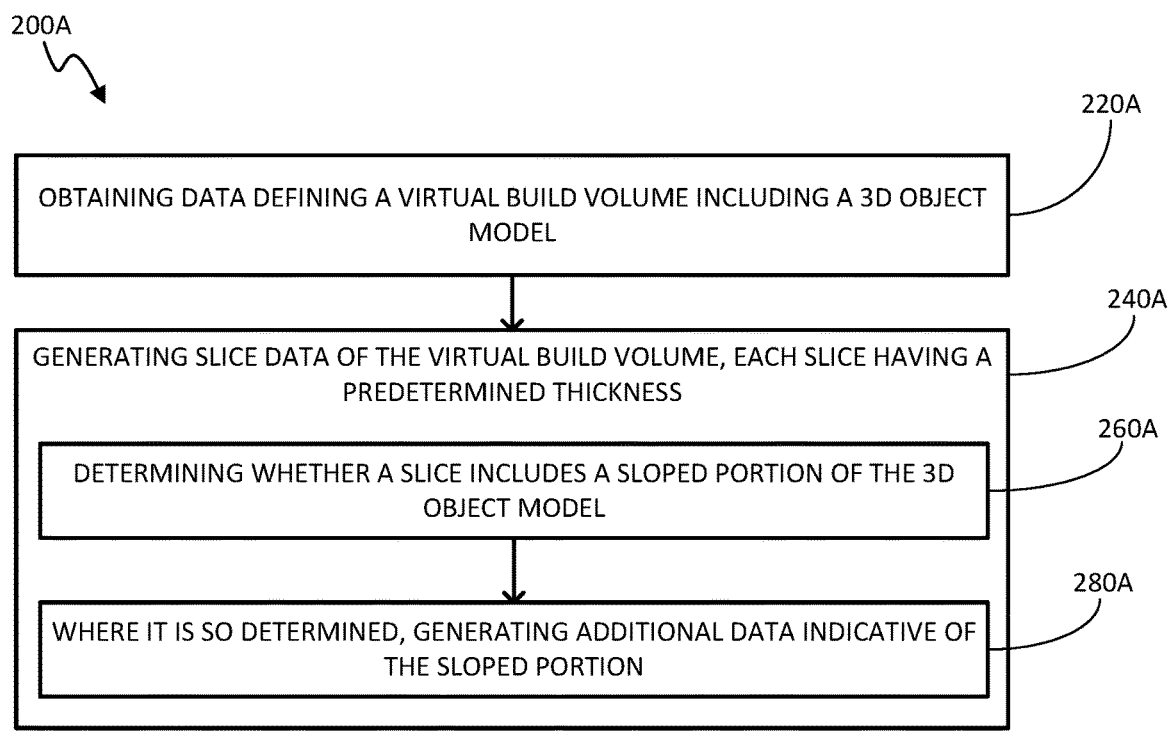
FIG. 2A is a flowchart of an example method of generating slice image data of a virtual build volume.

FIG. 2A is a flowchart of an example method 200A of generating slice image data of a virtual build volume. In some examples, method 200A is executed by a computing unit which is external to a 3D printer (e.g., 3D printer 100) and the output of method 200A is sent to the 3D printer. In other examples, however, the method 200A is executed by the controller 180 of the 3D printer 100. Further reference is made to FIG. 3A to FIG. 3C.

Figure 3A:
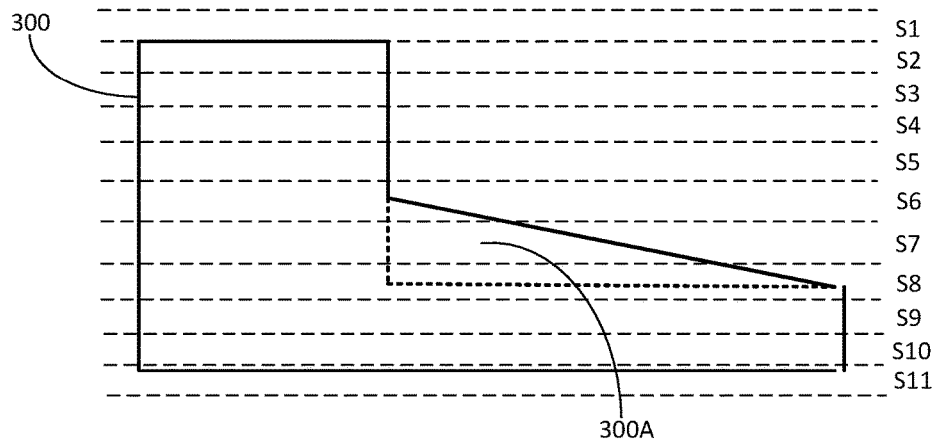
FIG. 3A illustrates schematically an example of a sliced digital model of a 3D object.

At block 220A, the computing unit obtains data defining a virtual build volume (see, e.g., FIG. 3A). As defined above, the virtual build volume defines the arrangement of a 3D object model (or plurality of 3D object models) with respect the overall build volume which is to be generated by the 3D printer 100. The arrangement comprises the position and orientation of the 3D object models within the virtual build volume. In some examples, the computing unit obtains the digital model of the 3D object and computes the virtual build volume based on the size of the build chamber and the received digital model. In other examples, the computing unit is to receive the virtual volume from an external computing entity.

At block 240A, the computing unit divides the virtual build volume into a set of horizontal slices S1 to S11 (see, e.g., FIG. 3A) having a predetermined thickness. Each slice may be represented by separate slice image data. In some examples, each slice has the same thickness value, e.g., 50, 80, 120 microns. In the examples herein, slice image data should be interpreted as data indicative of the portions of the corresponding build material layers to be solidified and the portions not to be solidified. Slice image data may, for example, by stored as two-dimensional array of pixels, such as a bitmap image. In order to generate the slice image data, the computing unit executes blocks 260A and 280A.

FIG. 3A shows an example of data including digital model of a 3D object 300. The 3D object 300 includes a 3D object portion 300A that includes a sloped profile. A slicing operation (e.g., block 240A) has been executed to the digital model of the 3D object 300. The slicing operation involves defining the digital model of the 3D object 300 in a plurality of slices. Each slice includes data representing the portions of a physical build material layer which are intended to be solidified and the remaining portions of the layer which are not intended to be solidified.

In the example, the 3D object 300 model has been sliced in eleven slices (i.e., S1-S11), three of which correspond to the 3D object portion 300A with the sloped profile (i.e., S6-S8). It is however to be understood that the digital model of the 3D object 300A may have been sliced in a different amount of slices.

Figure 3B:
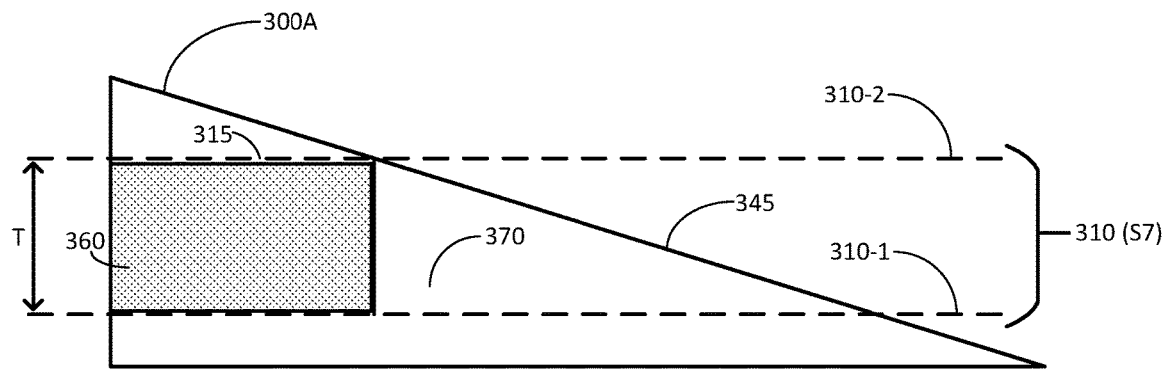
FIG. 3B illustrates schematically an example of a slice of a 3D object portion.

FIG. 3B shows an example of a close-up view of the 3D object portion 300A. For simplicity and clarity, a single slice S7 is shown. Slice S7 is referred hereinafter as slice 310. The digital model of the 3D object portion 300A comprises a sloped portion 345.

In the example, the illustrated slice 310 is defined by a bottom virtual horizontal plane 310-1 and a top virtual horizontal plane 310-2 (illustrated in dotted lines for clarity). The bottom virtual horizontal plane 310-1 corresponds to the bottom-most horizontal plane of the slice 310 and the top virtual horizontal plane 310-2 corresponds to the top-most horizontal plane of the slice 310. As such, the top virtual horizontal plane 310-2 of slice 310 may correspond to the bottom-most horizontal plane of the subsequent slice of the 3D object 300A (i.e., slice S6 of FIG. 3A).

3D printers generate build material layers of a predetermined thickness. As such, the distance between the bottom and top virtual horizontal planes (310-1, 310-2), or thickness (T) of the slice 310, is to correspond with the thickness of the physical build material layer to be generated by the 3D printer. In some examples, the thickness of the build material layer ranges from about 40 to about 120 microns, for example, 80 or 50 microns.

In examples, when a 3D object (e.g., 3D object portion 300A) is sliced, a 2-bit map (e.g., a 2D array of pixels) image is generated. Each pixel indicates whether the corresponding portion of the build material layer is to be solidified or not (i.e., each pixel of the bitmap defines, for each slice, whether the object exists at that pixel or not). The slice image data is used by a 3D printer to determine at which addressable locations of a layer of build material print agent should be applied. In some examples, a 3D printer may compute a contone map based on the slice image data.

The 3D printer 100 has the resolution to treat portions throughout the depth of the build material layer thickness. In examples, the 3D printer 100 resolution may be equated to the discretization of the slicing operation. As such, details smaller than such resolution may not be printed as specified in the digital model of the 3D object 300. For example, during the generation of the 3D object portion 300A, the sloped profile 345 has a finer resolution than the resolution of the 3D printer. In the example, the volume specified to be printed with respect to slice 310 correspond to illustrated volume 360 and volume 370. However, due to the discretization of the slicing process and the resolution of the 3D printer 100, the volume 360 is to be finally solidified. As such, the volume 370 remains un-solidified even if the volume 370 was originally part of the 3D object portion model 300A. This defect is known as stair stepping.

Turning back to FIG. 2A, at block 260A, the computing unit determines whether a given slice includes a sloped portion of the 3D object model. In some examples, the angle of the sloped portion is compared to an angle threshold to determine the magnitude of the stair-stepping effect. If it is determined that the given slice includes a sloped portion at a part of the 3D object, the computing unit generates additional data (block 280A) indicative of the sloped portion. The additional data may include the location and/or size of the sloped portion within the slice. In some examples, the additional data is stored as part of the slice image data. In other examples, the additional data is stored in as additional slice image. The purpose of the additional data is to cause a 3D printer that generates a 3D object based on the slice image data and the additional data to generate a 3D object in which the stair-stepping effect is reduced, as it is described in further detail below.

Figure 2B:
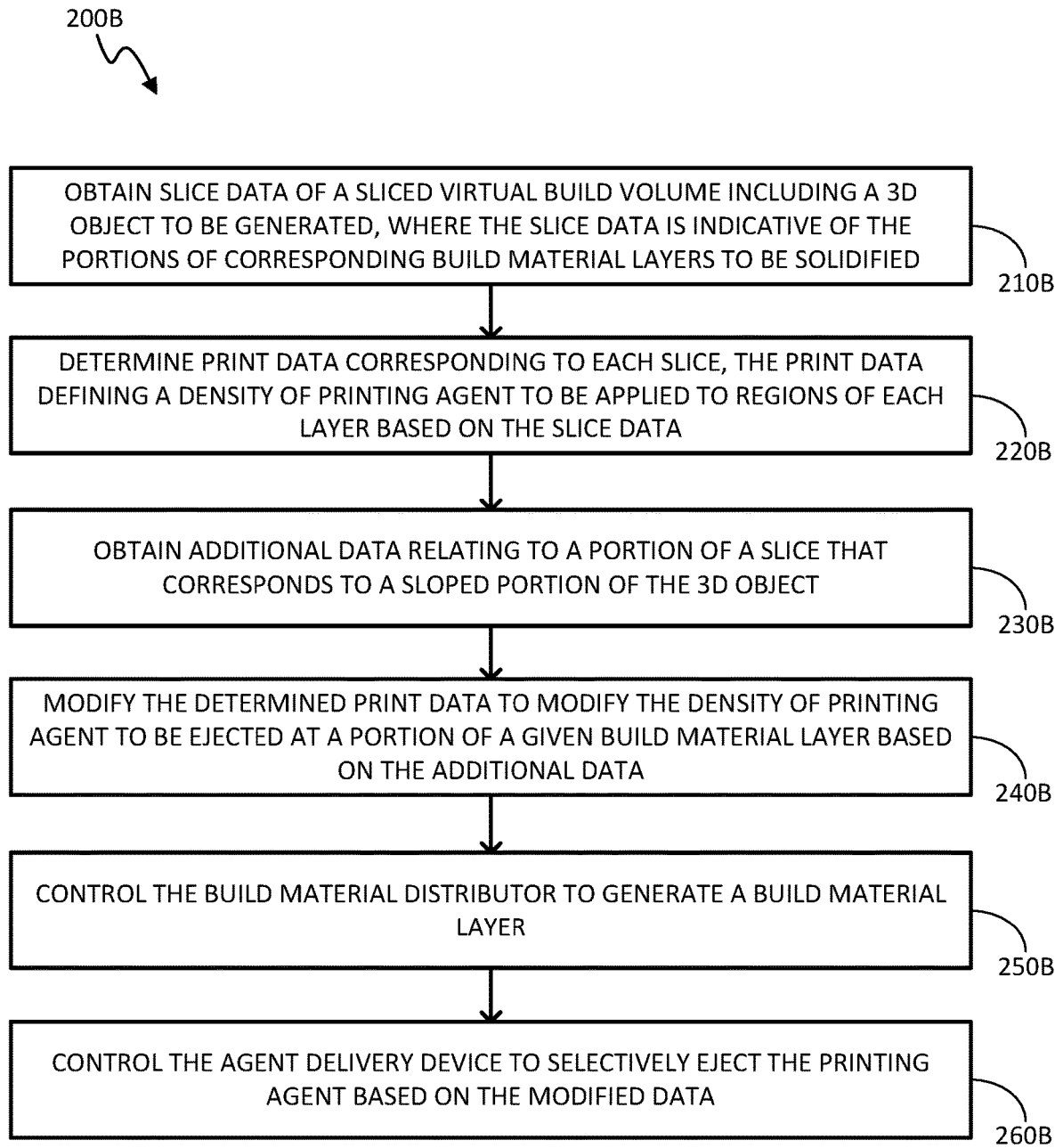
FIG. 2B is a flowchart of an example method of modifying print data.

FIG. 2B is a flowchart of an example method 200B of modifying print data. Method 200B is to be executed by the controller 180 of the 3D printer 100.

At block 210B, the controller 180 obtains slice image data of a sliced virtual build volume including a 3D object to be generated. In some examples, the controller 180 is to receive the slice image data of block 240A of FIG. 2A.

At block 220B, the controller 180 is to determine print data corresponding to each slice. In the examples herein, print data should be understood as being data that defines precise locations on each build material layer onto which a print agent is to be applied by the 3D printer. Typically, a 3D printer may apply a print agent, such as a fusing agent, at a coverage density (or contone level) that is less than 100% coverage (where 100% coverage equates to each addressable location of a region of a powder layer to be solidified having a drop of print agent applied by the 3D printer).

At block 230B, the controller 180 obtains the additional data relating to a portion of a given slice that corresponds to a sloped portion of the 3D object. In some examples, the controller 180 is to receive the additional data of block 280A of FIG. 2A. In some examples, the additional data is part of the slice image data. In other examples, the additional data is part of a virtual slice.

At block 240B, the controller 180 is to modify the determined print data of block 220B to modify the density or contone level of the printing agent to be ejected at a portion of a given build material layer based on the additional data obtained at block 230B. In some examples, the controller 180 is to increase the density or contone level of the printing agent at a zone of a build material layer corresponding to the sloped portion from the additional data. A detailed example is described further below with reference to FIGS. 4A-4D.

Figure 3C:
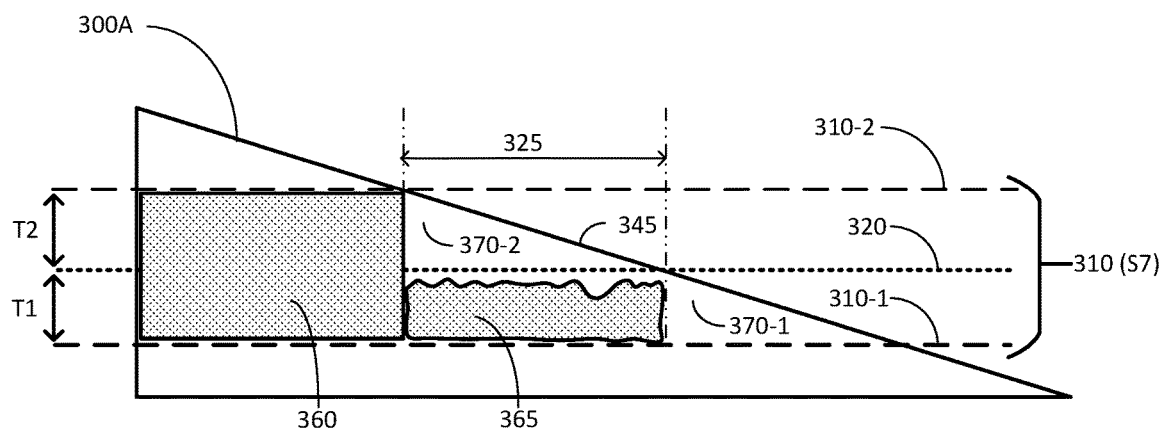
FIG. 3C illustrates schematically another example of a slice of a 3D object portion.

FIG. 3C shows an example of a modified slicing of a digital model of the 3D object portion 300A. Elements from FIG. 3C may be the same as or similar to the corresponding elements of FIG. 3B with the same reference numeral.

The controller 180 determines a virtual intermediate slice 320. In examples, the controller 180 divides slice 310 in half along the horizontal axis into two slices. In other examples, the controller 180 determines the virtual intermediate slice 320 in a horizontal plane between the bottom and top virtual horizontal planes (310-1, 310-2) from the slice 310. For clarity, the intermediate slice 310 is illustrated in fine dotted lines to distinguish from the virtual horizontal planes (310-1, 310-2) which have been illustrated in dashed lines. In some examples, the controller 180 determines the intermediate slice as a plane equidistant from the bottom and top virtual horizontal planes (310-1, 310-2) or, in other words, the plane equidistant to the two opposing surfaces of the slice 310. In other examples, the controller 180 determines the intermediate slice as a plane at different distances from the bottom virtual horizontal plane 310-1 and the top virtual horizontal plane 310-2.

The controller 180 then determines (step 260A) the intersection between the sloped profile 345 and the intermediate slice 320. The controller 180 further defines the sub-volume 365 as the volume below the intermediate slice 320 which is part of the 3D object portion 300A. The sub-volume 365 is a volume which is not to be generated due to the discretization of the slicing operation and the resolution of the 3D printer 100. Additionally, the controller 180 is to determine additional intermediate slices 320 between the bottom and top virtual horizontal planes (310-1, 310-2) to refine the corresponding sub-volume 365 according to the examples herein.

In some examples, the controller 180 determines that the intended geometry profile (e.g., sloped portion 345 of the 3D object digital model 300A) between the bottom and top virtual horizontal planes (310-1, 310-2) defines an angle with respect to a horizontal plane below a predetermined angle threshold. In some examples, the angle threshold ranges from about 1 to about 15 degrees, for example 2, 5, 10, 12 or 15 degrees. It is noted that for smaller angles, the stair stepping effect may become more visible in a generated 3D object. As such, in some examples, the controller 180 is to determine additional intermediate slices between the bottom and top virtual horizontal planes (310-1, 310-2) at different vertical positions from the first intermediate slice 320. In some examples, the controller 180 may determine to include the additional intermediate slice if the determined angle is below the predetermined threshold. In additional examples, the controller 180 may determine the inclusion of additional consecutive intermediate slices based on other parameters, such as the thickness (T) of the slice 310.

The intermediate slice 320 is determined between the bottom and top virtual horizontal planes (310-1, 310-2) at a first distance T1 from the bottom virtual horizontal plane 310-1 and at a second distance T2 from the top virtual horizontal plane 310-2. It is noted that the combined distances of the first and second distances (T1, T2) correspond to the slice thickness T (see, FIG. 3B). As mentioned above, in some examples, the first and second distances (T1, T2) are equidistant. In other examples, the first and second distances (T1, T2) are different distances. In yet additional examples, the controller 180 may include additional intermediate slices between the first and second distances (T1, T2) in compliance with the examples set out herein.

Consequently, the slice 310 of the 3D object 300A includes a plurality of internal volumes distributed in a first and a second volume sets. The first volume set includes a first volume 360 which is to be fully solidified in the normal 3D printing process, as its section ranges from the bottom to top virtual horizontal planes (310-1, 310-2) and it is compliant with the resolution of the 3D printer 100. The second volume set corresponds to the second (also referred herein as sub-volume 365), third (370-1) and fourth (370-2) volumes which are not to be solidified in the normal 3D printing process and are thereby not compliant with the resolution of the 3D printer (i.e., volumes in which stair stepping occurs).

As mentioned above, the second volume 365 may be defined as the volume of the 3D object portion 300A located between the intermediate slice 320 and the bottom virtual horizontal plane 310-1 which is not to be solidified due to the resolution of the 3D printer 100. In the examples herein, the associated projected top surface of the second volume 365 is referred to as zone 325.

The third volume 370-1 is the remaining volume of the 3D object 300B below the intermediate slice 320 which is not part of the first and second volumes (360, 365). The fourth volume 370-2 is the remaining volume of the 3D object 300B above the intermediate slice 320 which is not part of the first volume 360.

In the examples herein, the controller 180 is to modify the print data associated with the slice image data to cause the ejection of printing agent at a higher density or higher contone level by the agent delivery device 160 in the zone 325 of the actual build material layer or the preceding build material layer. The additional agent is to cause a bleeding effect. As understood in the examples herein, bleeding is an effect caused by the ejection of an additional amount of an agent (e.g., fusing, detailing, binder agents) in which the effect of the agent is transferred to neighboring portions of the build volume thereby causing the second sub-volume 365 (at least in part) to solidify and reduce the associated stair-stepping effect. An extensive example on the ejection of the additional printing agent, as well as its effects is described with reference to FIGS. 4A-4D.

Turning back to FIG. 2B, at block 250B, the controller 180 is to control the build material distributor 120 to generate a build material layer. At block 260B, the controller 180 is to control the agent delivery device 160 to selectively eject the printing agent (e.g., fusing or binder agent) to the build material layer based on the modified print data of block 240B. In some examples, the controller 180 is further to control the energy source of the 3D printer 100 to emit energy to the build material layer according to the examples herein (see, e.g., FIGS. 4A-4D). In additional examples, the computing unit may compute other virtual elements within the slice to determine the magnitude, size and location of the sloped profile. More examples have been disclosed with reference to FIG. 3C.

FIGS. 4A-4D illustrate an example on the generation of the 3D object portion 300A of the 3D object 300 of FIG. 3A by the 3D printer 100 of FIG. 1.

Figure 4A:
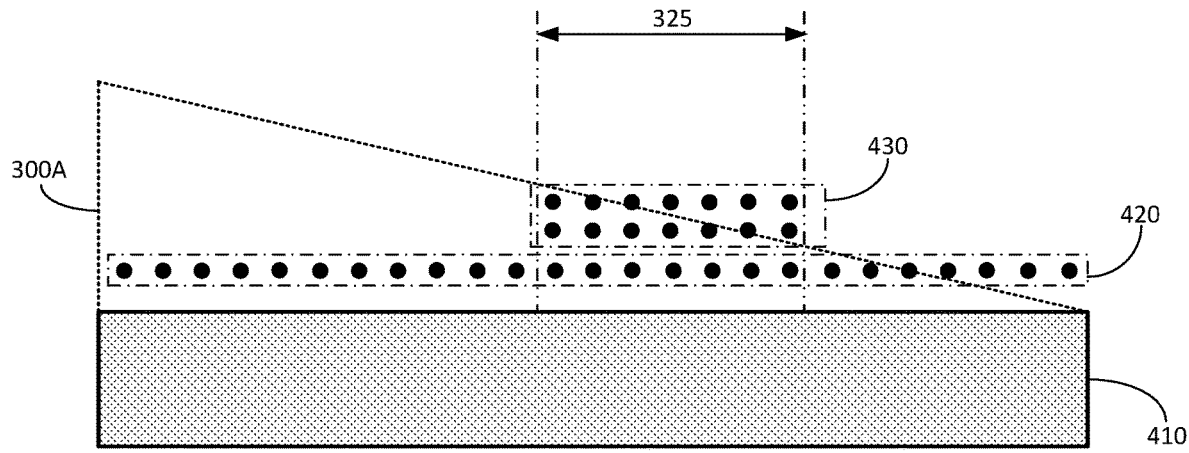
FIGS. 4A-4D illustrate an example of generating of a 3D object portion.

Referring to FIG. 4A, the controller 180 controls the build material distributor 120 to generate a first layer of build material 410. The first layer of build material 410 may correspond to the slice S8 of FIG. 3A. In the example shown, the first layer of build material 410 has a predetermined thickness T (see, thickness T of FIG. 3B).

In the examples in which the printing agent is a fusing agent, the controller 180 is then to control the agent delivery device 160 to selectively eject an amount of fusing agent 420 on the first layer of build material 410 based on the print data. The print data may include data from the slice S8 indicative of the portions of the layer in which fusing agent should be deposited thereon.

To solidify a portion of a build material layer, an amount of fusing agent is selectively ejected on the build material layer. An example agent delivery device 160 of the present disclosure is able to deliver printing agents at a resolution of 1400 dpi (drops per inch). However, this does not mean that the agent delivery device 160 is to eject a drop of the printing agent (e.g., fusing agent) to each addressable location within the portions to be solidified, or in other words, to have a contone level of 100%. Fusing and binder agents are ejected at contone levels below 100%, 80%, 60% or 40%, thereby leaving room for the ejection of an additional amount of an agent in the addressable locations in which no fusing or binder agent has been ejected thereto, or in other words, increase the density of agent in some locations.

As such, the controller 180 is to control the agent delivery device 160 to selectively eject an additional amount of the fusing agent 430 based on the modified print data; e.g., to the portions of the first build material layer 410 corresponding to zone 325 (see, zone 325 of FIG. 3C which correspond to the portion of the subsequent layer to receive the second volume 365). The additional amount of fusing agent 430 is intended to cause bleeding (e.g., thermal bleed) to portions of the subsequent layer of build material to be formed thereon, for example upon being heated.

Figure 4B:
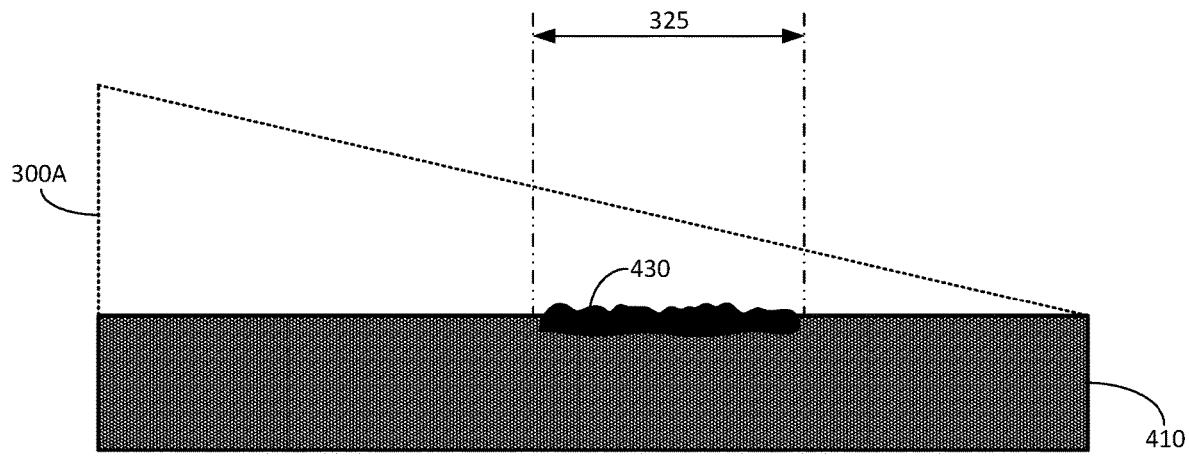

The controller 180 is to control the energy source to irradiate energy to the first build material layer 410 and solidify the portions of the first build material layer 410 in which the amount of printing agent 420 was deposited thereto. In some examples, a first amount of energy is used to heat the build material to a temperature close but below the melting point of the build material and a second amount of energy is absorbed by the fusing agent to coalesce the portions of build material where the agent has been ejected thereto, which are solidified upon cooling. However, the additional amount of fusing agent 430 causes additional heat energy to be absorbed (FIG. 4B).

Figure 4C:
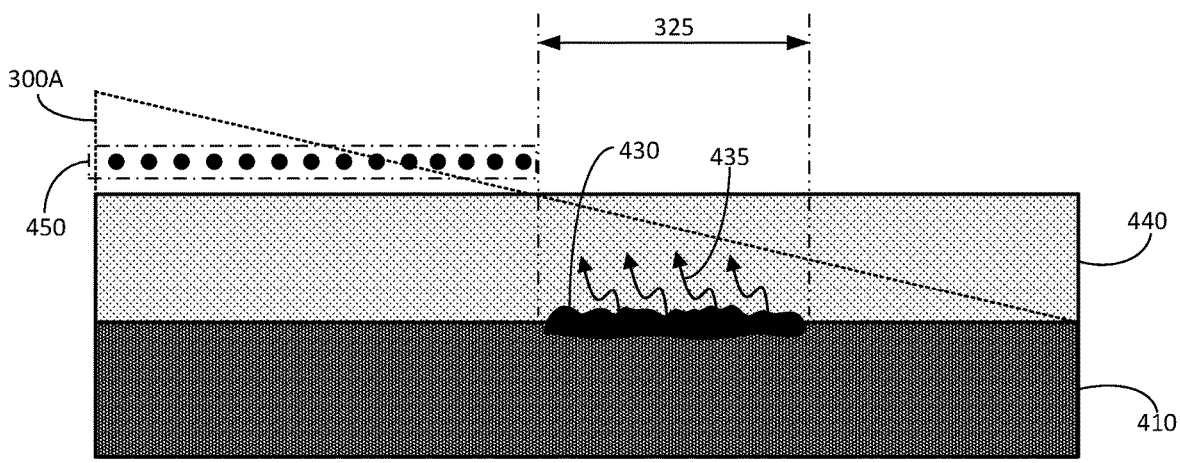
Figure 4D:
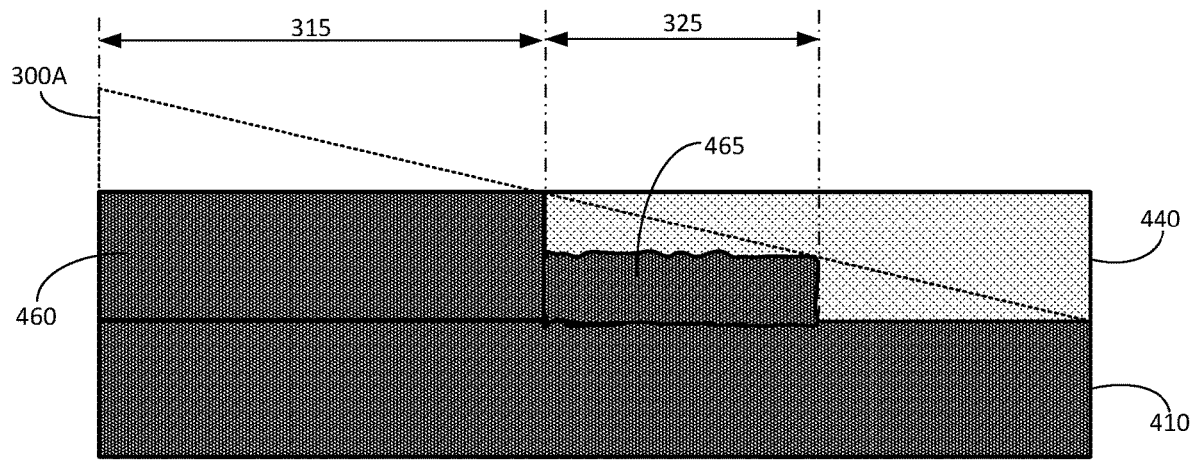

Turning now to FIG. 4C, the controller 180 is to control the build material distributor 120 to generate a second layer of build material 440, which corresponds to slice 310 of FIGS. 3B-3C. Following with the examples in which the printing agent is a fusing agent, the controller 180 is then to control the agent delivery device 160 to selectively eject an amount of fusing agent 450 on the second layer of build material 440 based on the print data.

The controller 180 is then to control the energy source to irradiate energy to the second build material layer 440. The irradiated energy is to heat the build material of the second build material layer 440 and is in part absorbed by the amount of fusing agent 450 to coalesce, fuse and solidify the portions where the fusing agent was ejected thereto upon cooling, thereby solidifying the first volume 360 (see, first volume 360 of FIGS. 3B and 3C).

The additional amount of fusing agent 430 is further to heat 435 the lower portions of the second build material layer 440 (e.g., portions corresponding to the second volume 365 of FIG. 3C) through thermal bleed 435. These portions, in conjunction with the energy irradiated to the second build material layer 440, cause the portions to coalesce, fuse and solidify upon cooling, thereby leaving the first volume 460 and second volumes 465 solidified (FIG. 4D) and reducing the stair stepping effect as disclosed above.

The examples above may also be implemented through the ejection of a binder agent. In the examples in which the printing agent is a binder agent, the additional amount of binder agent 430 ejected on the first build material layer 410 is to bleed (e.g., wetting) into the neighboring portions of the second build material layer 440 (e.g., portions corresponding to the second volume 360). In some examples, the amount of binder agent is to bleed (i.e., wet) upwards into the next build material layer and/or downwards to the previous build material layer.

The examples herein have ejected the additional amount of printing agent 430 to the preceding build material layer (i.e., first build material layer 410). However, it is understood that based on the geometry of the sloped profile, the controller 180 may have controlled the agent delivery device 160 to eject the additional amount of printing agent 430 on the second (subsequent) build material layer 440 to achieve a similar effect. That way the bleed (e.g., wetting) or the thermal bleed would have coalesced, fused and solidified upon cooling the portions of build material starting from the upper surface of the second build material layer 440.

The examples herein provide with the solidification of the second volume 365 of the 3D object portion 300A without modifying the thickness of the slice which is not printable through the normal operation of the 3D printer 100 due to its resolution, thereby reducing the stair stepping defect of the 3D object 300.

In some examples, the amount of the additional agent to be ejected in the area 325 may be based on random distribution, a gradient distribution and/or the height between the bottom virtual horizontal plane 310-1 and the intermediate slice 320 (i.e., thickness T1). In the examples in which the additional amount of printing agent is based on a gradient distribution, it may be based on the intersection points defined by the sloped profile 345 and the intermediate slices 320.

In some examples, the controller 110 may additionally send the modified print data to the controller of the 3D printer 100. The 3D printer 100 is to generate the 3D object 300 based on the modified print data. In other examples, however, the controller generates the modified print data in the 3D printer 100.

Figure 5:
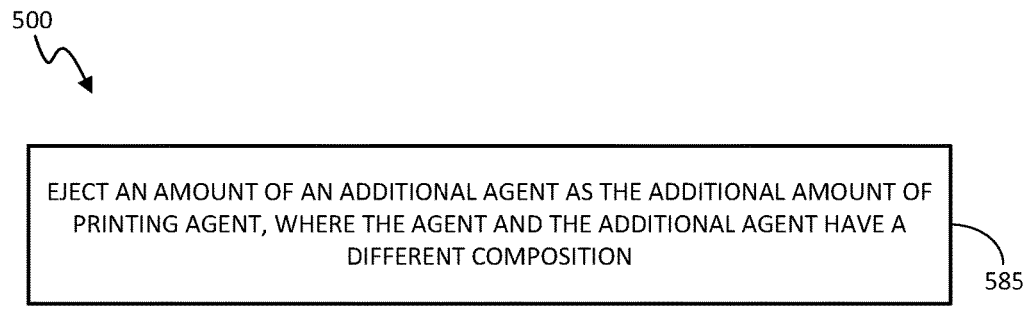
FIG. 5 is a flowchart of an example method of modifying print data including a 3D object.

FIG. 5 is a flowchart of an example method 500 of modifying print data to include the ejection of an agent and an additional agent. Block 585 from method 500 may correspond to further instructions from FIG. 2A (not shown), instructions of which when executed, cause the processor 185 of the controller 180 to perform the method 500 of FIG. 5.

Different agents may contribute to bleed (e.g., wetting) or thermal bleed in different ways. A given amount of a first agent may generate more bleeding than the same given amount of a second agent which has a different composition than the first agent. At block 585, the controller 180 modifies the print data to include the ejection of an amount of a second additional agent as the additional amount of printing agent 430. The first and the second agents have different compositions, which enables the control of a fine and course degree of bleeding. In an example, an amount of the first agent contributes with a greater extent to bleeding than the same amount of the second agent. In the example, the controller 180 controls the ejection of the first agent to generate most part of the bleeding and then the ejection of the second agent to refine an additional amount of bleeding to achieve a target amount of bleeding.

In some examples, the first and second agents are fusing agents and have different thermal absorptions to generate different levels of thermal bleed. In other examples, the first and second agents are binder agents with different viscosities to generate different levels of bleeding. The more viscosity the agent has, the less it penetrates to the layers of powdered build material, hence increasing the bleeding rate of the binder agent.

Figure 6:
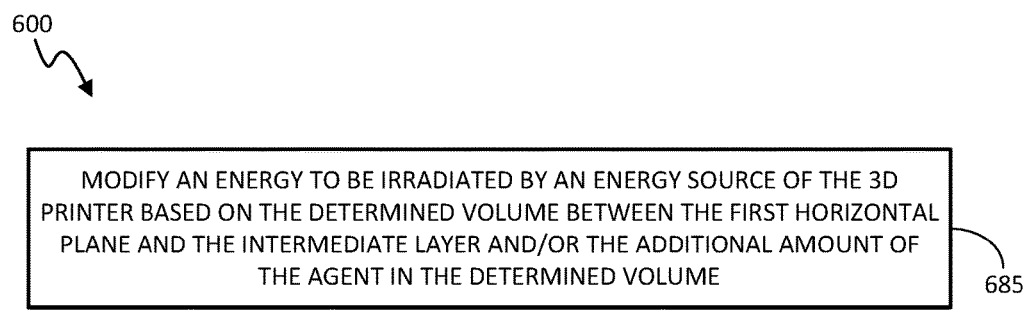
FIG. 6 is a flowchart of an example method to modify the energy to be irradiated to generate a 3D object.

FIG. 6 is a flowchart of an example method 600 to modify the energy to be irradiated to generate a 3D object (e.g., 3D object 300 of FIG. 3A). Block 685 from method 600 may correspond to further instructions from FIG. 2 (not shown), instructions of which when executed, cause the processor 185 of the controller 180 to perform the method 600 of FIG. 6.

At block 685, the controller 180 is to modify the print data to include further instructions to modify an energy source to be irradiated by the energy source of the 3D printer. In some examples, the controller 180 is to modify the print data based on the second volume 365. Additionally, or alternatively, the controller 180 is further to modify the print data based on the additional amount of printing agent 430 in the second volume 365.

Figure 7:
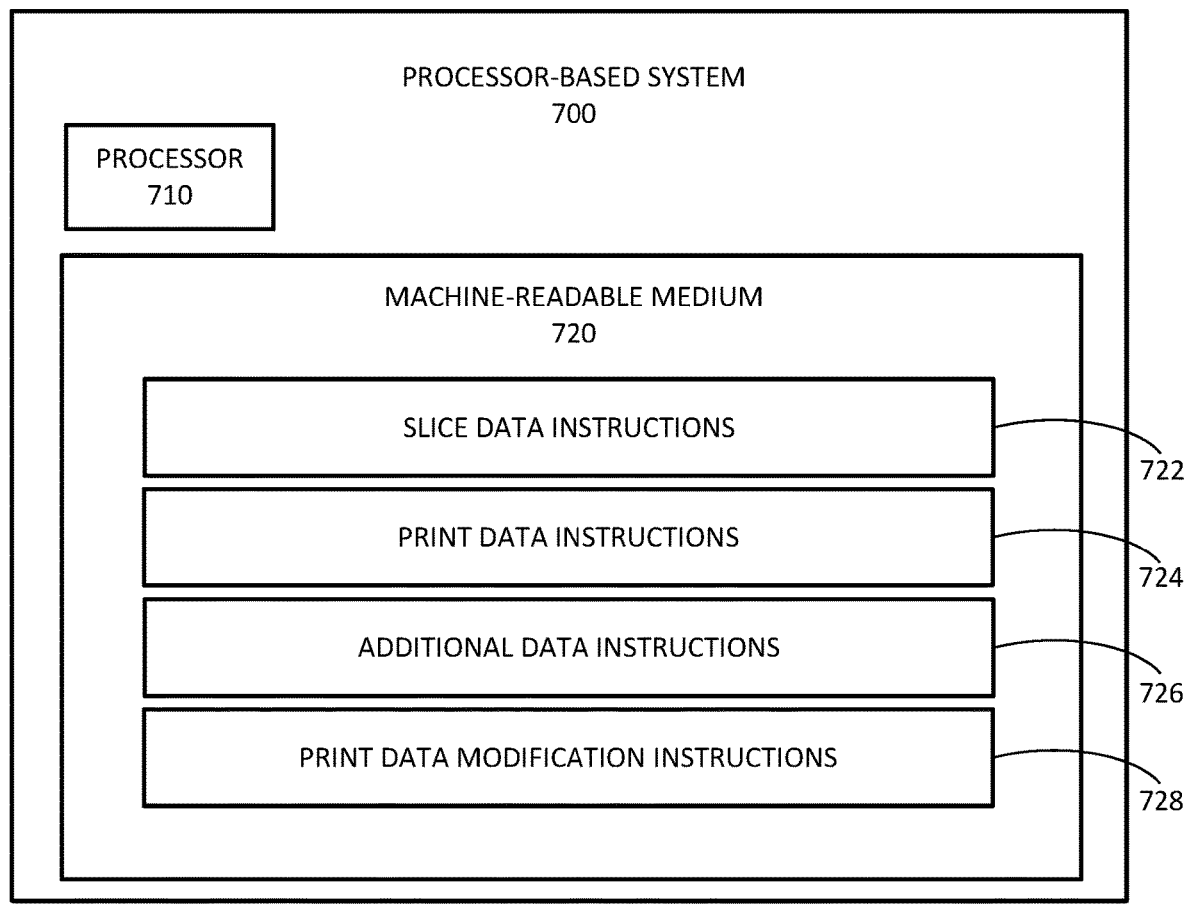
FIG. 7 is a block diagram showing a processor-based system example of a system to modify print data.

FIG. 7 is a block diagram showing a processor-based system example of a system to modify print data to include the ejection of an agent. In some implementations, the system 700 may be or may form part of a computing system and/or a 3D printing system, such as 3D printer 100. In some implementations, the system 700 is a processor-based system and may include a processor 710 coupled to a machine-readable medium 720. The processor 710 may include a single-core processor, a multi-core processor, an application-specific integrated circuit (ASIC), a field programmable gate array (FPGA), and/or any other hardware device suitable for retrieval and/or execution of instructions from the machine-readable medium 720 (e.g., instructions 722-728) to perform functions related to various examples. Additionally, or alternatively, the processor 710 may include electronic circuitry for performing the functionality described herein, including the functionality of instructions 722-728. With respect of the executable instructions represented as boxes in FIG. 7, it should be understood that part or all of the executable instructions and/or electronic circuits included within one box may, in alternative implementations, be included in a different box shown in the figures or in a different box not shown.

The machine-readable medium 720 may be any medium suitable for storing executable instructions, such as a random-access memory (RAM), electrically erasable programmable read-only memory (EEPROM), flash memory, hard disk drives, optical disks, and the like. In some example implementations, the machine-readable medium 720 may be a tangible, non-transitory medium, where the term "non-transitory" does not encompass transitory propagating signals. The machine-readable medium 720 may be disposed within the processor-based system 700, as shown in FIG. 7, in which case the executable instructions may be deemed "installed" on the system 700. Alternatively, the machine-readable medium 720 may be a portable (e.g., external) storage medium, for example, that allows system 700 to remotely execute the instructions or download the instructions from the storage medium. In this case, the executable instructions may be part of an "installation package". As described further herein below, the machine-readable medium may be encoded with a set of executable instructions 722-728.

Instructions 722, when executed by the processor 710, cause the processor 710 to obtain slice image data of a sliced virtual build volume including a 3D object to be generated. The slice image data is indicative of the portions of corresponding build material layers to be solidified.

Instructions 724, when executed by the processor 710, may cause the processor 710 to determine print data corresponding to each slice. The print data defined a density of printing agent to be applied to regions of each layer based on the slice image data. In some examples, the printing agent is a fusing agent or a binder agent.

Instructions 726, when executed by the processor 710, may cause the processor 710 to obtain additional data relating to a portion of a slice that corresponds to a sloped portion of the 3D object.

Instructions 728, when executed by the processor 710, may cause the processor 710 to modify the determined print data to modify the density of printing agent to be printed at a portion of a given build material layer based on the additional data.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What it is claimed is:

1. A system comprising:
a processor; and
a memory storing instructions executable by the processor to:
obtain slice image data of a sliced virtual build volume for a three-dimensional (3D) object to be additively manufactured by an additive manufacturing apparatus, the 3D object including a sloped portion, the slice image data comprising a plurality of slices including a first slice, an intermediate slice above the first slice and including a region corresponding to the sloped portion, and a second slice above the first slice;
determine print data for a plurality of layers of build material, such that generation of the 3D object by the additive manufacturing apparatus based on the print data comprises:
depositing a first layer of build material;
selectively depositing print agent on the first layer based on both the first slice and the intermediate slice, and then selectively fusing the first layer;
after selectively fusing the first layer, depositing, on top the first layer, a second layer of build material;
selectively depositing the print agent on the second layer based on the second slice, and then selectively fusing the second layer; and
cause the additive manufacturing apparatus to generate the 3D object based on the print data.

2. The system of claim 1, wherein the printing agent is a fusing agent or a binder agent.

3. The system of claim 1, wherein selectively depositing the print agent on the first layer based on both the first slice and the intermediate slice comprises selectively depositing a first print agent on the first layer based on the first slice and selectively depositing a second print agent on the first layer based on the intermediate slice.

4. The system of claim 3, wherein the first agent and the second agent have different thermal absorption or a different viscosity.

5. The system of claim 1, wherein obtaining of the slice image data includes:
determining that the sloped portion defines an angle with a horizontal plane below a predetermined threshold; and
determining an additional intermediate slice above the first layer at a different vertical position than the intermediate slice.

6. The system of claim 1,
wherein selectively fusing the first layer comprises controlling an energy source to modify an energy irradiated on the first layer based on both the first slice and the intermediate slice.

7. A method comprising:
obtaining, by a processor, slice image data of a sliced virtual build volume for a three-dimensional (3D) object to be additively manufactured by an additive manufacturing apparatus, the 3D object including a sloped portion, the slice image data comprising a plurality of slices including a first slice, an intermediate slice above the first slice and including a region corresponding to the sloped portion, and a second slice above the first slice;
generating, by the processor, print data for a plurality of layers of build material, such that generation of the 3D object by the additive manufacturing apparatus based on the print data comprises:
depositing a first layer of build material;
selectively depositing print agent on the first layer based on both the first slice and the intermediate slice, and then selectively fusing the first layer;
after selectively fusing the first layer, depositing, on top the first layer, a second layer of build material;
selectively depositing the print agent on the second layer based on the second slice, and then selectively fusing the second layer; and
causing, by the processor, the additive manufacturing apparatus to generate the 3D object based on the print data.

8. The method of claim 7, wherein obtaining the slice image data comprises
determining the intermediate slice.

9. The method of claim 8, wherein the intermediate slice is determined as a plane equidistant from a top surface of the first slice and a top surface of the second slice.

10. The method of claim 8, wherein obtaining the slice image data further comprises:
determining that the sloped portion defines an angle with a horizontal plane below a predetermined threshold; and
determining an additional intermediate slice above the first slice at a different vertical position than the intermediate slice.

11. A non-transitory machine-readable medium storing instructions executable by a processor to perform processing comprising:
obtaining slice image data of a sliced virtual build volume for a three-dimensional (3D) object to be additively manufactured by an additive manufacturing apparatus, the 3D object including a sloped portion, the slice image data comprising a plurality of slices including a first slice, an intermediate slice above the first slice and including a region corresponding to the sloped portion, and a second slice above the first slice;
generating print data for a plurality of layers of build material, such that generation of the 3D object by the additive manufacturing apparatus based on the print data comprises:
depositing a first layer of build material;
selectively depositing print agent on the first layer based on both the first slice and the intermediate slice, and then selectively fusing the first layer;
after selectively fusing the first layer, depositing, on top the first layer, a second layer of build material;
selectively depositing the print agent on the second layer based on the second slice, and then selectively fusing the second layer; and
causing the additive manufacturing apparatus to generate the 3D object based on the print data.

12. The non-transitory machine-readable medium of claim 11, wherein obtaining the sliced image data comprises:
determining that the sloped portion defines an angle with a horizontal plane below a predetermined threshold; and
determining an additional intermediate slice above the first slice at a different vertical position than the intermediate slice.

* * * * *